March 5, 1935.　　　C. E. HARTS　　　1,993,167
VALVE CONTROL
Filed April 15, 1933
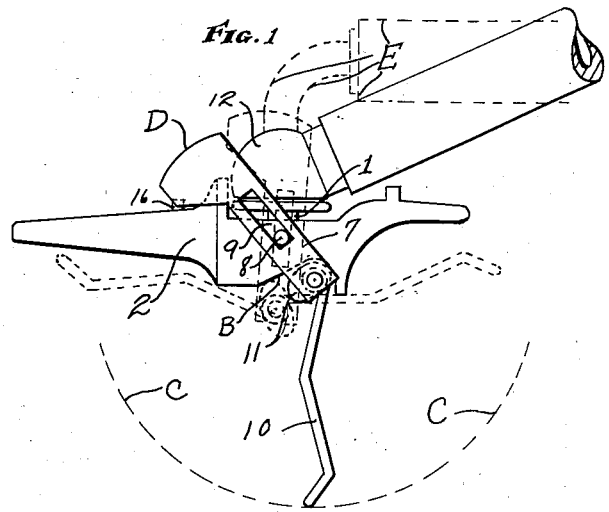
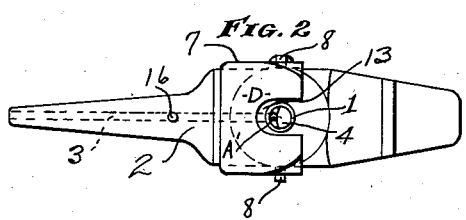
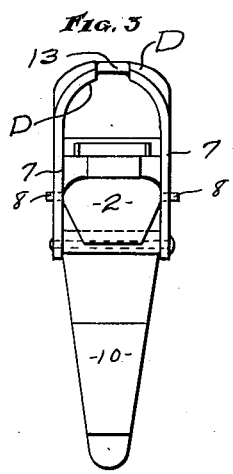
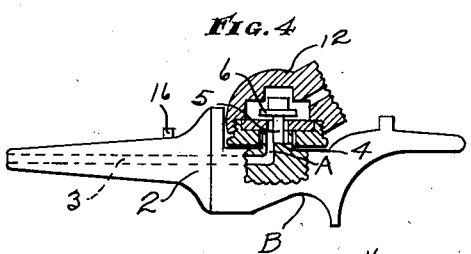
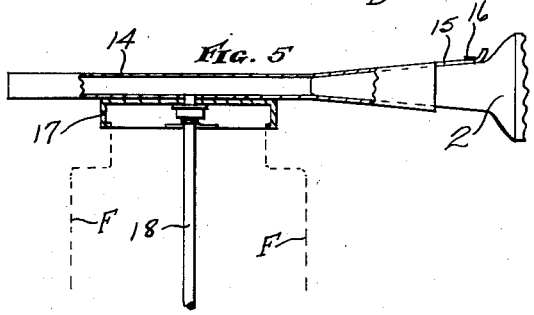
INVENTOR.
CHARLES E. HARTS
BY
ATTORNEY.

Patented Mar. 5, 1935

1,993,167

UNITED STATES PATENT OFFICE 1,993,167

VALVE CONTROL

Charles E. Harts, Wichita, Kans.

Application April 15, 1933, Serial No. 666,246

1 Claim. (Cl. 284—16)

My invention relates to a valve control.

The object of my invention is to provide an opening means for a valve under air compression, the said means embodied with a nozzle directing the stream blast of the air.

A further object of my invention is to provide a coupling element for the valve body to the nozzle to move the same reciprocatingly to open the valve and permit the same to close automatically.

A still further object of my invention is to provide a coupling to seat on the valve body and partially conform thereto to avoid removal when the valve is normally closed.

These and other objects will hereinafter be more fully explained, reference being had to the accompanying drawing forming a part of this specification, and in which like characters will apply to like parts in the different views.

Referring to the drawing:—

Fig. 1 is a side view of the nozzle with the hose valve in position and a modified form thereof shown by dotted lines.

Fig. 2 is a top view with the hose valve removed.

Fig. 3 is a rear end view of Fig. 2.

Fig. 4 is a side view showing the nozzle and valve partly in section, the yoke and lever removed.

Fig. 5 is a view showing the adaptability of the nozzle to an atomizer.

My invention referred to and disclosed in this application consists of a tubular extension 1 integral with and extending outward from a nozzle body 2, the said body having a duct 3 longitudinally extending therethru to near one end and having a right angle bend as at A communicating with the said tubular extension as an inlet for air forced therethru by means later described. The said tubular extension has a bore greater in diameter than that of the duct, by which means a seat 4 is formed at one side of the duct, in other words, the said right angle bent portion of the duct enters the tubular extension at one side as shown at A' in Fig. 2.

Being thus arranged the stem 5 of the disc valve 6 will strike thereon to open the same and the stem being smaller in diameter than the bore affords ample room for air to enter the duct, and furthermore closing of the duct by the stem is avoided by its concentric position of the stem as it contacts on the seat.

As a means to compress the hose valve upon the said tubular extension to reciprocatingly move the valve body I have arranged a yoke 7 pivotally and slidably carried on the nozzle thru the medium of a pair of pins 8 oppositely disposed on the sides of the nozzle and axially aligned to engage in their respective elongated slots 9 that are positioned in each leg of the yoke.

Pivotally arranged on the lower end of the leg members is a lever 10 integral with a cam 11, the said cam adapted to seat in a depression B on the under side of the nozzle, by which means when the lever is rocked as indicated by dotted line C in Fig. 1, the yoke is moved reciprocatingly to move the valve to and from the nozzle as controlling means for the valve action.

On the other end of the yoke is a seat D concaved to engage on the valve body 12 which is spherical in form; the rear portion of the seat being contracted as shown in Fig. 3 provides means to frictionally engage on the said valve body as moved rearward over the same; the tension arranged thereby will avoid the said seat removing freely from its engagement with the valve body.

The seat element has a slot 13 extending therein from the rear side to receive the neck of the valve body should the latter be as shown by dotted lines E in Fig. 1, and furthermore the said slot centrally disposed thru the concavity of the seat will permit the rear portion thereof to spring outward as forced to position on the said valve body of the hose valve.

In Fig. 5 is shown the application of a spray consisting of a tubular body 14 funneled at the rear end to conform to the shape of the nozzle as carrying means therefor and retained in position by a tongue 15 integral therewith and extending rearward to engage on a stud 16 passing thru an aperture in the outer end of the tongue and removable by an upward spring of the tongue for disengagement from the stud.

Secured to the tube is a lid 17 having a tube 18 axially secured to the lid, the last said tube extending downward into a container as shown by dotted lines F, the said container having means of attachment to the lid as storage means for fluid drawn therefrom by the blast of air passing thru the first said tube, by which means a spray is discharged at the outer end as atomized from the container.

The above described function of atomizing may be for the purpose of spraying paint, oil, medicinal fluid, or other fluids, and such other modifications may be employed as lie within the scope of the appended claim, and having fully described my invention, what I claim as new and desire to secure by Letters Patent is:—

In a clamping means for a nozzle to a valve body, the valve body having a neck radially extending and having a valve stem opening, the nozzle having a depression on one side and a seat on the other side oppositely and having a duct partially extending therethrough longitudinally and turned outward through a tubular extension concentric to the seat and pins oppositely extending and secured to the nozzle body between the seat and depression, a yoke consisting of a pair of slotted legs to straddle the nozzle body so that the slots will engage with the pins, a concavo seat in the yoke and having a slot extending into the seat by which means the said seat portion of the yoke will snugly engage on the valve body as the slot receives the neck, a cam pivotally carried near and between the ends of the legs, the cam to engage in the depression and means to rock the said cam moving the yoke upon the pins, all as and for the purpose specified.

CHARLES E. HARTS.